United States Patent
Yasuda (10) Patent No.: US 7,057,646 B2
(45) Date of Patent: Jun. 6, 2006

(54) FOCUS ADJUSTING SYSTEM, IMAGE CAPTURE APPARATUS AND CONTROL METHOD THEREOF

(75) Inventor: Hitoshi Yasuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 11 days.

(21) Appl. No.: 10/887,776

(22) Filed: Jul. 9, 2004

(65) Prior Publication Data

US 2005/0023435 A1    Feb. 3, 2005

(30) Foreign Application Priority Data

Jul. 28, 2003    (JP)    ............... 2003-280793

(51) Int. Cl.
*H04N 5/228*    (2006.01)
*G02B 7/04*     (2006.01)
*G03B 13/00*    (2006.01)

(52) U.S. Cl. .............. 348/208.99; 250/201.2; 348/208.12; 348/345; 348/351

(58) Field of Classification Search ............ 250/201.2; 396/53; 348/208.99, 208.12, 208.4, 351, 348/345

See application file for complete search history.

(56) References Cited

U.S. PATENT DOCUMENTS 5,561,498 A * 10/1996 Sekine et al. ............. 396/53
2001/0010559 A1 * 8/2001 Hirasawa et al. ......... 348/350
2005/0083430 A1 * 4/2005 Hirasawa et al. ......... 348/349

FOREIGN PATENT DOCUMENTS

JP    10-322583 A    12/1998

* cited by examiner

*Primary Examiner*—Georgia Epps
*Assistant Examiner*—Brian Livedalen
(74) *Attorney, Agent, or Firm*—Canon USA, Inc. Intellectual Property Division (57) ABSTRACT

A focus adjusting system includes an optical unit movable to adjust a focus of an object image to an image capture unit for imaging an object to produce a signal representative of the object image, a detection unit for extracting, as a first signal, a high-frequency component of the signal produced by the image capture unit, a moving unit for moving the optical unit a first amount of movement so as to cause the first signal to reach a maximum value, and a changing unit for changing the first amount of movement according to a quantity of image shake of the object image occurring in the image capture unit.

6 Claims, 9 Drawing Sheets

FOCUS ADJUSTING SYSTEM, IMAGE CAPTURE APPARATUS AND CONTROL METHOD THEREOF

BACKGROUND OF THE INVENTION

1. Field of the Invention

The present invention relates to a focus adjusting system, an image capture apparatus and a control method thereof, and is suitable for coping with such a situation that a large quantity of image shake (commonly called "camera shake") occurs in an object image taken by the image capture apparatus because of, for example, an unsteady hand of the apparatus user.

2. Description of Related Art

The current trend in automatic focusing apparatuses for video cameras is to use an AF (automatic focusing) evaluation value for focus adjustment. The AF evaluation value is detected as the sharpness of a taken picture from a video signal obtained by photo-electrically converting an object image via an image capture element or the like. Then, the position of a focusing lens is controlled to make the level of the AF evaluation value maximum.

Figure 2:
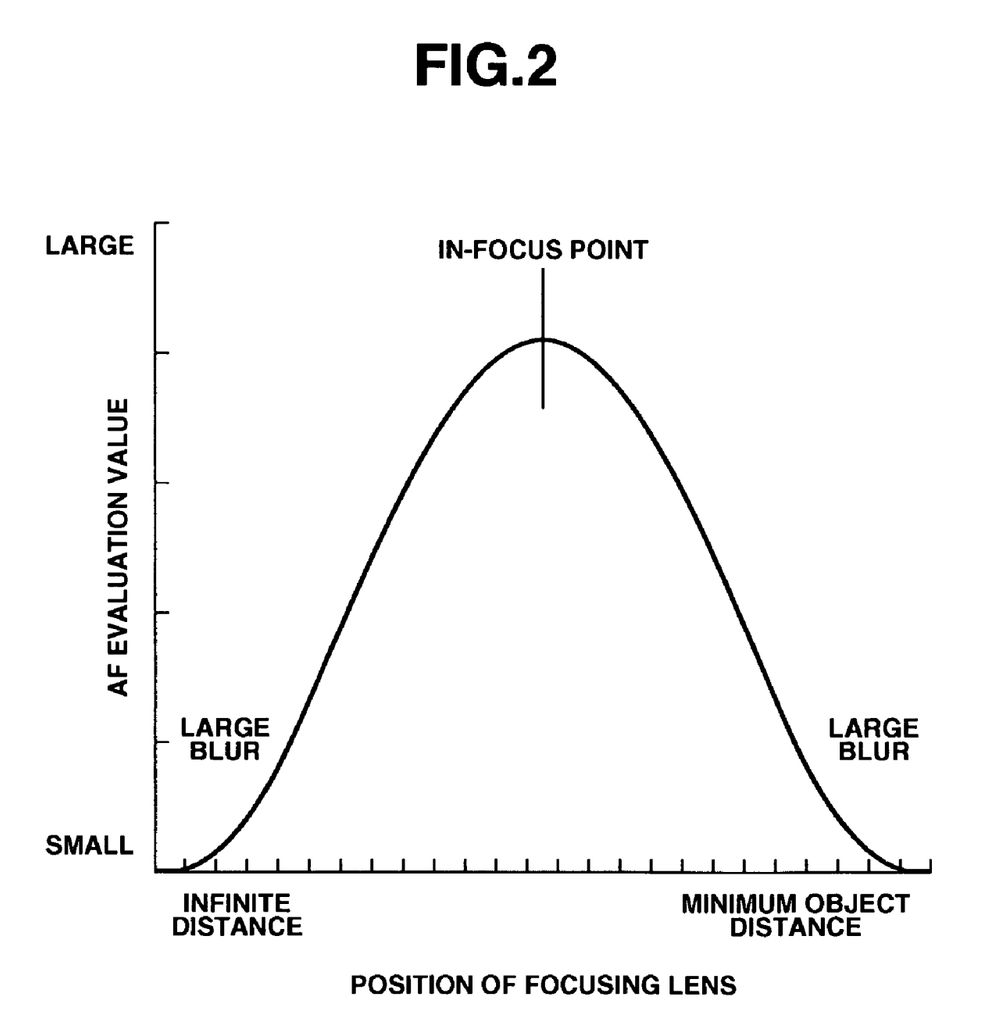
FIG. 2 is a diagram showing a curve for an AF evaluation value.

As the AF evaluation value, use is generally made of the level of a high-frequency component of the video signal that is extracted by a band-pass filter having a given bandwidth. When an ordinary object image is taken, the level of the AF evaluation value increases as the focusing lens approaches an in-focus point, as shown in FIG. 2. The in-focus point is considered to be the position of the focusing lens where the AF evaluation value has reached a maximum level.

In addition, some video cameras are equipped with an image stabilizing apparatus. The image stabilizing apparatus detects the quantity of image shake of a taken picture by sensing a signal from an angular velocity sensor such as a vibration gyroscope or by detecting motion vectors from an image signal, and compensates for image shake optically or electronically on the basis of the quantity of image shake detected.

In such a video camera capable of detecting image shake, information on image shake can be utilized for controlling automatic focusing. For example, Japanese Laid-Open Patent Application No. Hei 10-322583 (page 6 and FIG. 2) proposes that automatic focusing be inhibited as long as a large quantity of image shake occurs.

However, the above proposal has the following problem. If automatic focusing is suspended as long as a large quantity of image shake occurs, automatic focusing cannot respond to changes in object distance that may take place during such a period.

SUMMARY OF THE INVENTION

The present invention has been made in consideration of the above situation, and an object of the present invention is to enable adequate focus adjustment even when a large quantity of image shake is occurring.

Another object of the present invention is to enable automatic focusing to adequately respond to changes in object distance even if a large quantity of image shake occurs.

According to an aspect of the present invention, the foregoing objects are attained by providing a focus adjusting system including an optical unit movable to adjust a focus of an object image to an image capture unit for imaging an object to produce a signal representative of the object image, a detecting unit for extracting, as a first signal, a high-frequency component of the signal produced by the image capture unit, a moving unit for moving the optical unit a first amount of movement so as to cause the first signal to reach a maximum value, and a changing unit for changing the first amount of movement according to a quantity of image shake of the object image occurring in the image capture unit.

Other features and advantages of the present invention will be apparent from the following detailed description of embodiments thereof when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the invention will be described in detail below with reference to the drawings.

Figure 1:
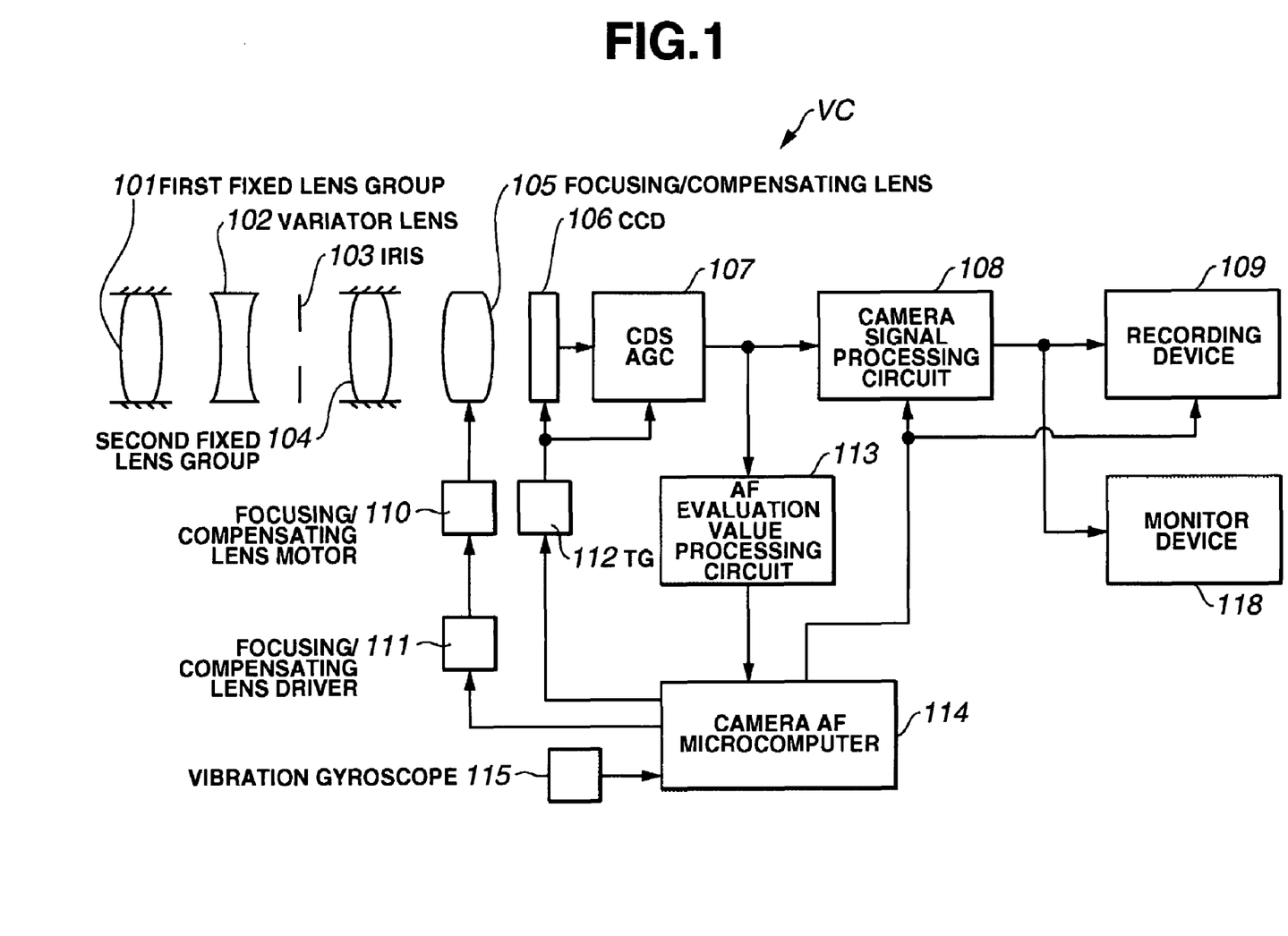
FIG. 1 is a block diagram of the components of a video camera according to an embodiment of the invention.

FIG. 1 is a block diagram showing the components of a video camera VC according to an embodiment of the invention. The video camera VC includes a first fixed lens group 101, a variator lens 102 for variable magnification, an iris 103, a second fixed lens group 104, and a focusing/compensating lens (hereinafter referred to as a "focusing lens") 105. The focusing lens 105 has both the function of compensating for movement of a focal plane resulting from variable magnification and the function of adjusting focus. The video camera VC further includes a CCD (charge coupled device) 106, a CDS/AGC (correlated double sampling/automatic gain control) circuit 107, a camera signal processing circuit 108, and a recording device 109. The CCD 106 serves as an image capture element. The CDS/AGC circuit 107 samples and gain-controls the output of the CCD 106. The camera signal processing circuit 108 processes the output signal from the CDS/AGC circuit 107 into a signal compatible with the recording device 109. The recording device 109 uses a magnetic tape as a recording medium.

The video camera VC further includes a motor 110, a driver 111, a timing generator (hereinafter referred to as a "TG") 112, an AF (automatic focusing) evaluation value processing circuit 113, a camera AF microcomputer 114, and a monitor device 118. The motor 110 serves as an actuator for moving the focusing lens 105. The driver 111 drives the motor 110 according to a signal from the camera AF microcomputer 114. The TG 112 generates a pulse signal to drive the CCD 106 according to setting values from the camera AF microcomputer 114. The AF evaluation value processing circuit 113 extracts a high-frequency component for use in focus detection from the output signal of the CDS/AGC circuit 107. The camera AF microcomputer 114 controls the driver 111 on the basis of the output signal of the AF evaluation value processing circuit 113 so as to drive the focusing lens 105, and issues to the recording device 109 a command to record an image signal. The monitor device 118 displays thereon an image represented by the output signal of the camera signal processing circuit 108, allowing the user to observe the image.

The video camera VC further includes an angular velocity sensor 115. The angular velocity sensor 115 can be a vibration gyroscope and produces a sensor output, which is used for the camera AF microcomputer 114 to detect the quantity of image shake. While, in the present embodiment, an angular velocity sensor, such as a vibration gyroscope, is used for an image-shake detecting method, an alternative arrangement for detecting motion vectors using image detection may be employed without using any sensors.

AF control operation of the camera AF microcomputer 114 is described next in detail with reference to FIGS. 3 to 7. An overall AF control process is first described with reference to FIG. 3.

Figure 3:
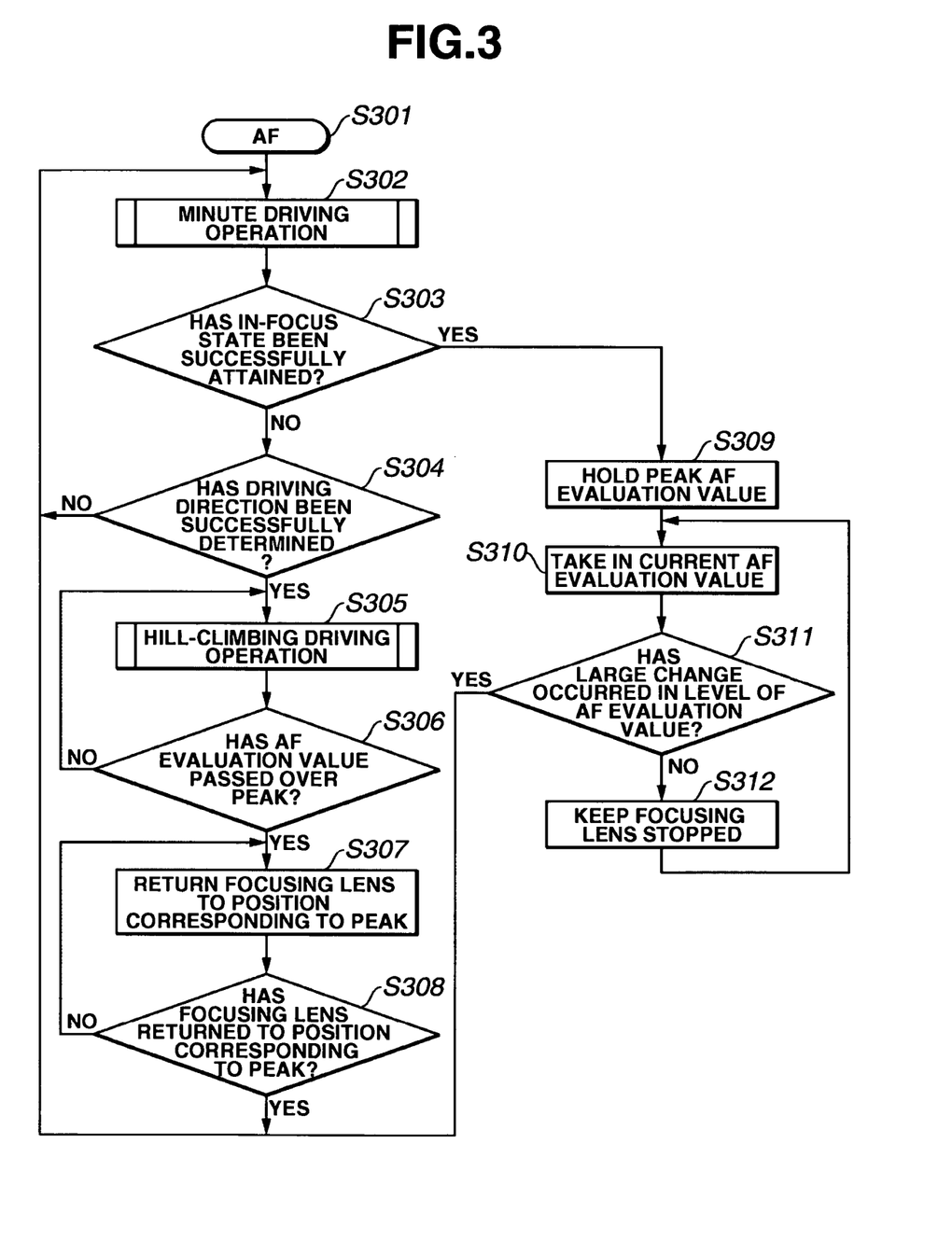
FIG. 3 is a flow chart illustrating an AF control process.

At step S301, the processing flow for the AF control process begins.

At step S302, a minute driving operation is performed to determine whether an in-focus state has been attained and, if not, to determine in which direction an in-focus point is present. The details of the minute driving operation are described later with reference to FIG. 4.

At step S303, a check is made to see if an in-focus state has been successfully attained at the step S302. If so, the processing flow proceeds to step S309, where an in-focus/restart determining process is performed. If not, the processing flow proceeds to step S304.

At step S304, a check is made to see if the driving direction for the focusing lens 105 has been successfully determined at the step S302. If so, the processing flow proceeds to step S305, where a hill-climbing driving operation is performed. If not, the processing flow returns to step S302, where the minute driving operation is continued.

At step S305, the hill-climbing driving operation is performed to drive the focusing lens 105 at a predetermined speed in such a direction as to increase the AF evaluation value. The details of the hill-climbing driving operation are described later with reference to FIG. 6.

At step S306, a check is made to see if the AF evaluation value has passed over a peak in the hill-climbing driving operation performed at the step S305. If so, the processing flow proceeds to step S307. If not, the processing flow returns to step S305, where the hill-climbing driving operation is continued.

At step S307, the focusing lens 105 is returned to its position where the peak of the AF evaluation value has been found in the hill-climbing driving operation.

At step S308, a check is made to see if the focusing lens 105 has returned to its position where the peak of the AF evaluation value has been found. If so, the processing flow returns to step S302, where the minute driving operation is resumed. If not, the processing flow returns to step S307, where the operation of returning the focusing lens 105 to the peak position is continued.

The in-focus/restart determining process beginning with step S309 is described next.

At step S309, an AF evaluation value obtained when the focusing lens 105 is at an in-focus point is held.

At step S310, the current AF evaluation value is taken in.

At step S311, the AF evaluation value held at the step S309 is compared with the current AF evaluation value to make a check to see if a large change has occurred in level of the AF evaluation value. If so, the processing flow proceeds to step S302, where the minute driving operation is resumed. If not, the processing flow proceeds to step S312.

At step S312, the focusing lens 105 is brought to a stop. Then, the processing flow returns to step S310, where the in-focus/restart determining process is continued.

Figure 4:
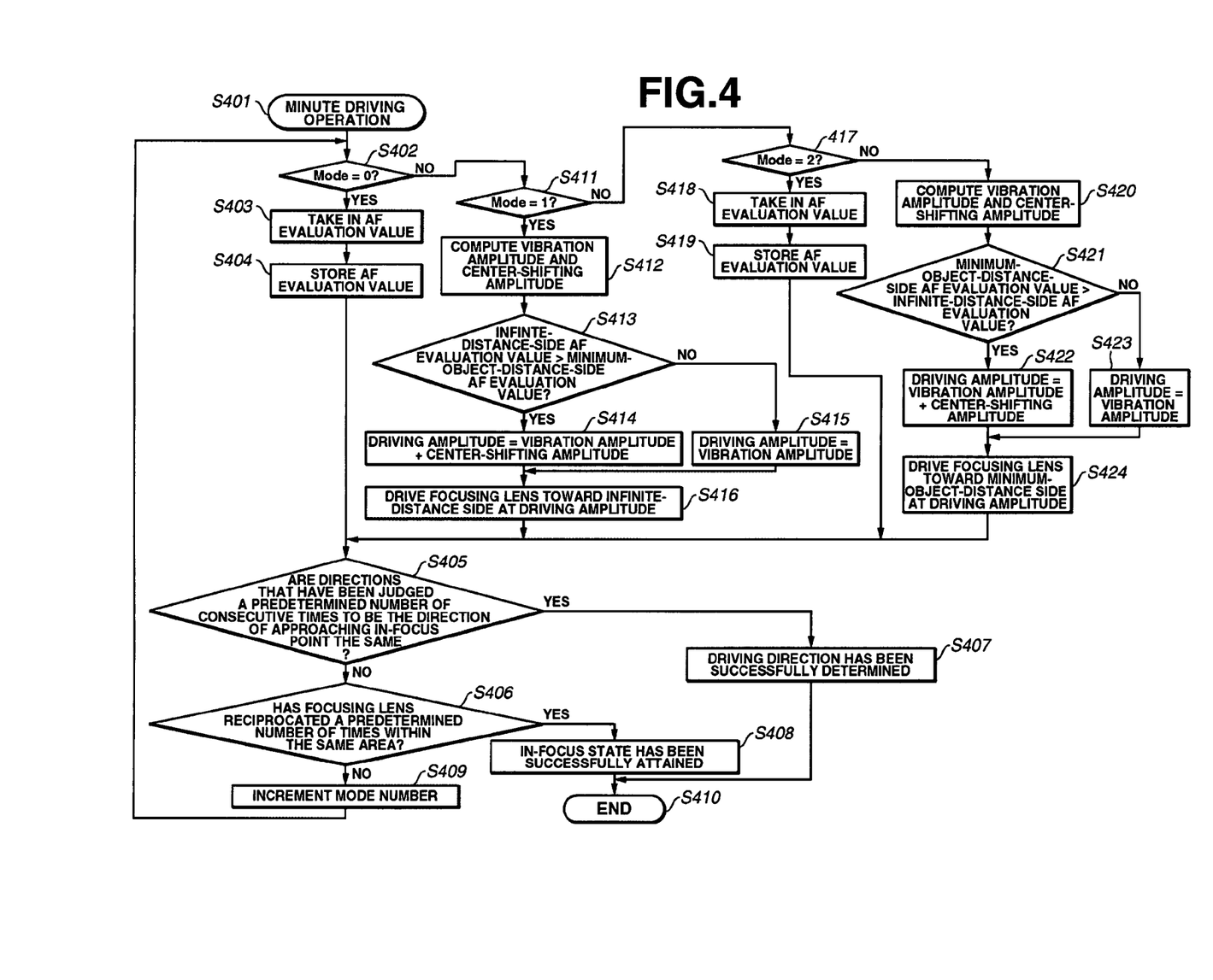
FIG. 4 is a flow chart illustrating a minute driving operation for determining whether an in-focus point has been reached.

The minute driving operation is described next with reference to FIG. 4.

At step S401, the processing flow for the minute driving operation begins.

At step S402, a check is made to see if the current mode is "Mode 0". If so, the processing flow proceeds to step S403, where a process in a lens position on the minimum-object-distance side is performed. If not, the processing flow proceeds to step S411.

(Process in a Lens Position on the Minimum-Object-Distance Side)

At step S403, an AF evaluation value is taken in from the AF evaluation value processing circuit 113. This AF evaluation value is the one obtained from a video signal produced from electric charges stored in the CCD 106 when the focusing lens 105 is situated on the infinite-distance side at the time of "Mode 2" (to be described later).

At step S404, the AF evaluation value taken in at the step S403 is stored as an infinite-distance-side AF evaluation value.

At step S405, a check is made to see if driving directions of the focusing lens 105 that have been judged a predetermined number of consecutive times to be the direction of approaching an in-focus point are the same. If so, the processing flow proceeds to step S407. If not, the processing flow proceeds to step S406.

At step S406, a check is made to see if the focusing lens 105 has reciprocated within a predetermined area a predetermined number of times. If so, the processing flow proceeds to step S408. If not, the processing flow proceeds to step S409, where a parameter indicative of the current mode number is incremented (the parameter being returned to "0" when reaching "4"). Then, the processing flow returns to step S402.

At step S407, the driving direction of the focusing lens 105 is considered to have been successfully determined. The processing flow proceeds to step S410, where the minute driving operation comes to an end. Then, the processing flow proceeds to the hill-climbing driving operation.

At step S408, an in-focus state is considered to have been successfully attained. The processing flow proceeds to step S410, where the minute driving operation comes to an end. Then, the processing flow proceeds to the in-focus/restart determining process.

At step S411, a check is made to see if the current mode is "Mode 1". If so, the processing flow proceeds to step S412, where a process for driving the focusing lens 105 toward the infinite-distance side is performed. If not, the processing flow proceeds to step S417.

(Process for Driving the Focusing Lens 105 Toward the Infinite-Distance Side)

At step S412, a vibration amplitude and a center-shifting amplitude for use in the minute driving operation are computed. Although not been described in detail herein, the amplitude is generally decided on the basis of the depth of focus, i.e., the amplitude is made smaller if the depth of focus is shallow and the amplitude is made larger if the depth of focus is deep.

At step S413, the infinite-distance-side AF evaluation value obtained at the time of "Mode 0" (described above) is compared with a minimum-object-distance-side AF evaluation value obtained at the time of "Mode 2" (to be described later). If the infinite-distance-side AF evaluation value is larger than the minimum-object-distance-side AF evaluation value, the processing flow proceeds to step S414. If the infinite-distance-side AF evaluation value is equal to or smaller than the minimum-object-distance-side AF evaluation value, the processing flow proceeds to step S415.

At step S414, a driving amplitude is set as follows:

driving amplitude=vibration amplitude+center-shifting amplitude.

At step S415, the driving amplitude is set as follows:

driving amplitude=vibration amplitude.

At step S416, the focusing lens 105 is driven toward the infinite-distance side at the driving amplitude as set at the step S414 or S415.

Then, the processing flow proceeds to step S405 and subsequent steps, which have been described above.

At step S417, a check is made to see if the current mode is "Mode 2". If so, the processing flow proceeds to step S418, where a process in a lens position on the infinite-distance side is performed. If not, the processing flow proceeds to step S420.

(Process in a Lens Position on the Infinite-Distance Side)

At step S418, an AF evaluation value is taken in from the AF evaluation value processing circuit 113. This AF evaluation value is the one obtained from a video signal produced from electric charges stored in the CCD 106 when the focusing lens 105 is situated on the minimum-object-distance side at the time of "Mode 0" (described above).

At step S419, the AF evaluation value taken in at the step S418 is stored as an minimum-object-distance-side AF evaluation value.

Then, the processing flow proceeds to step S405 and subsequent steps, which have been described above.

(Process for Driving the Focusing Lens 105 Toward the Minimum-Object-Distance Side)

At step S420, a vibration amplitude and a center-shifting amplitude for use in the minute driving operation are computed. Although not been described in detail herein, the amplitude is generally decided on the basis of the depth of focus, i.e., the amplitude is made smaller if the depth of focus is shallow and the amplitude is made larger if the depth of focus is deep.

At step S421, the minimum-object-distance-side AF evaluation value obtained at the time of "Mode 2" (described above) is compared with the infinite-distance-side AF evaluation value obtained at the time of "Mode 0" (described above). If the minimum-object-distance-side AF evaluation value is larger than the infinite-distance-side AF evaluation value, the processing flow proceeds to step S422. If the minimum-object-distance-side AF evaluation value is equal to or smaller than the infinite-distance-side AF evaluation value, the processing flow proceeds to step S423.

At step S422, a driving amplitude is set as follows:

driving amplitude=vibration amplitude+center-shifting amplitude.

At step S423, the driving amplitude is set as follows:

driving amplitude=vibration amplitude.

At step S424, the focusing lens 105 is driven toward the minimum-object-distance side at the driving amplitude as set at the step S422 or S423.

Then, the processing flow proceeds to step S405 and subsequent steps, which have been described above.

Figure 5:
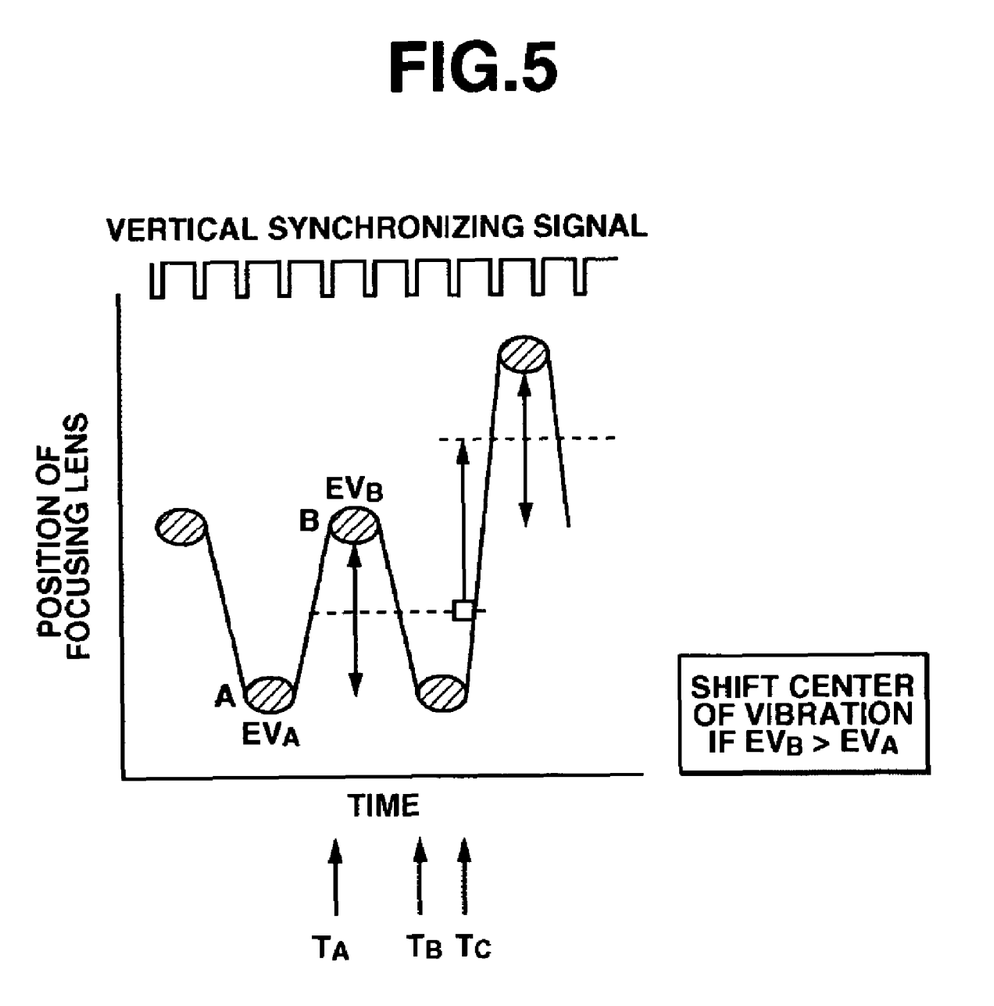
FIG. 5 is a diagram showing the movement of a focusing lens relative to time.

FIG. 5 shows the above-described behavior of the focusing lens 105 relative to time. In FIG. 5, the abscissa axis indicates time, and the ordinate axis indicates the position of the focusing lens 105. A periodic pattern of downward projections shown in the upper part of FIG. 5 indicates a vertical synchronizing signal included in a video signal. Referring to FIG. 5, an AF evaluation value $EV_A$ produced from electric charges (indicated by a hatched ellipse) stored in the CCD 106 during a period of time A is taken in at a point of time $T_A$, and an AF evaluation value $EV_B$ produced from electric charges (also indicated by a hatched ellipse) stored in the CCD 106 during a period of time B is taken in at a point of time $T_B$. At a point of time $T_C$, the AF evaluation value $EV_A$ is compared with the AF evaluation value $EV_B$. If $EV_B > EV_A$, the center of vibration is shifted. On the other hand, if $EV_A = EV_B$, the center of vibration is not shifted.

Figure 8:
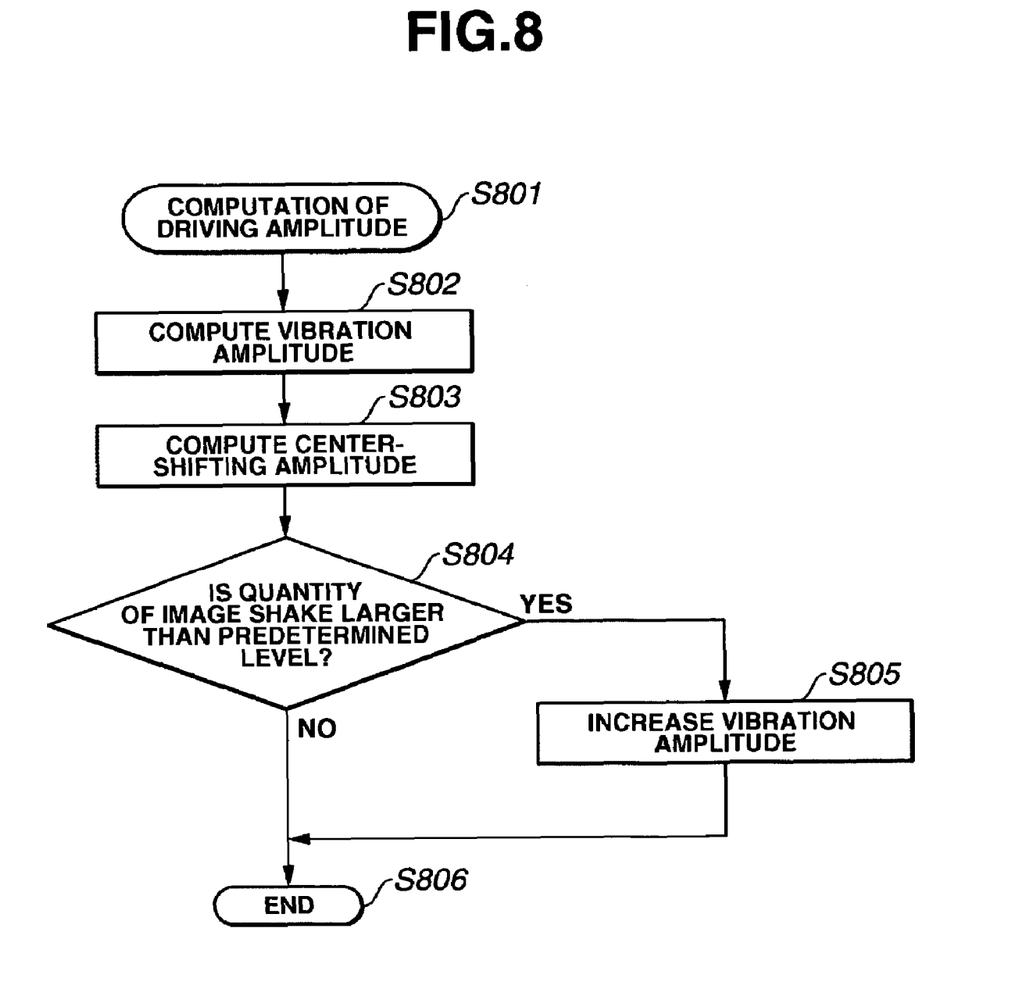
FIG. 8 is a flow chart illustrating a part of the AF control process performed when a large quantity of image shake occurs.

Essential features of the invention are described next with reference to FIGS. 8, 9A and 9B. FIG. 8 shows the details of the processing flow of step S412 or S420 shown in FIG. 4.

At step S801, the processing flow for the driving amplitude computing process begins.

At steps S802 and S803, the vibration amplitude and the center-shifting amplitude are computed, respectively. The vibration amplitude can be set, based on the depth of focus, to an amount of movement that causes such a variation in AF evaluation value as to enable the driving direction of the focusing lens 105 to be determined. The center-shifting amplitude can also be set, based on the depth of focus, to an amount of movement that enables the focusing lens 105 to respond to a change in object distance without delay.

At step S804, the quantity of image shake is detected to make a check as to whether the quantity of image shake is larger than a predetermined level. If the quantity of image shake is not larger than the predetermined level, the processing flow proceeds to step S806. If the quantity of image shake is larger than the predetermined level, the processing flow proceeds to step S805.

At step S805, since the image shake, the quantity of which is large, is considered to have a great influence on an AF evaluation value, the vibration amplitude as set at the step S802 is increased, so that a variation in AF evaluation value resulting from a difference in position of the focusing lens 105 can be made larger.

At step S806, the processing flow for the driving amplitude computing process comes to an end.

Figure 9A:
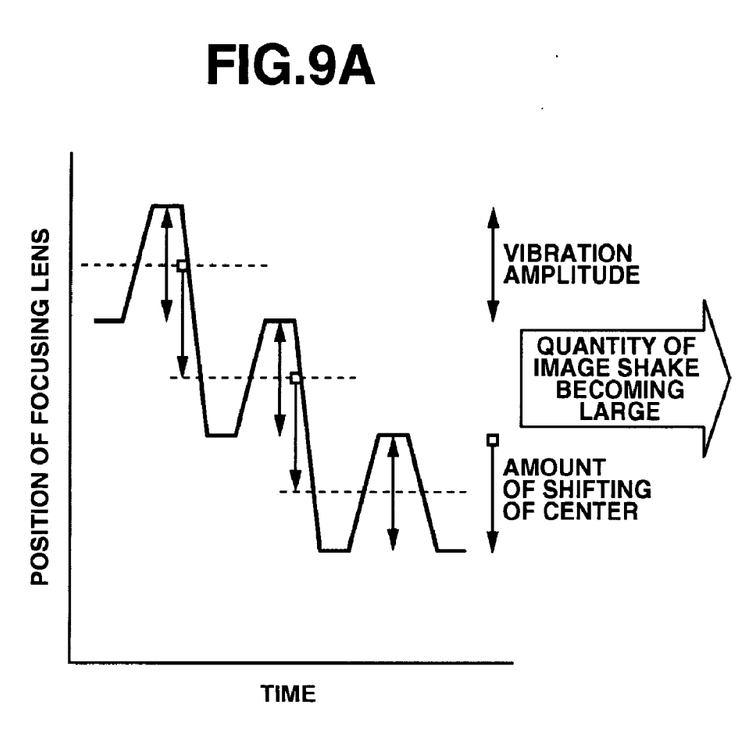
FIGS. 9A and 9B are diagrams illustrating the movement of the focusing lens in a normal condition and in a condition where a large quantity of image shake occurs, respectively.
Figure 9B:
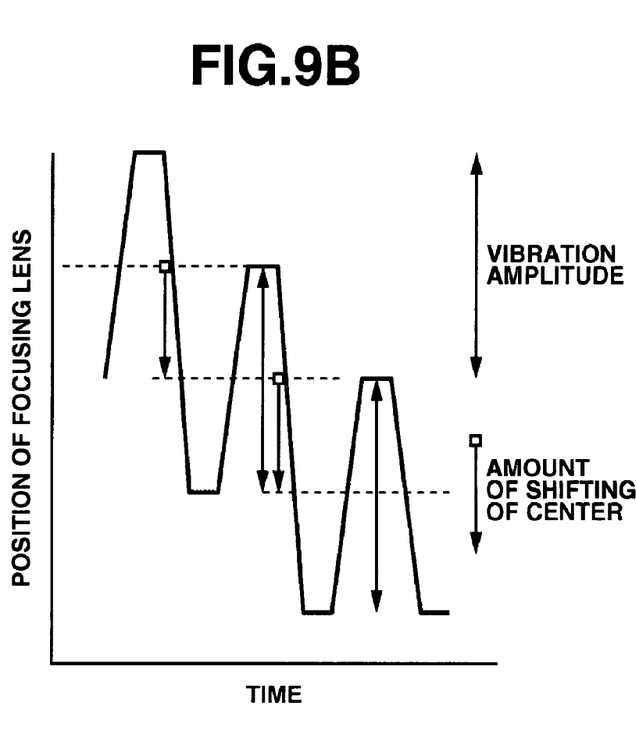

FIGS. 9A and 9B show the behavior of the focusing lens 105 according to the embodiment of the invention. FIG. 9A shows the position of the focusing lens 105 relative to time in a normal condition, and FIG. 9B shows the position of the focusing lens 105 relative to time in a condition where a large quantity of image shake occurs. The abscissa axis indicates time and the ordinate axis indicates the position of the focusing lens 105. Each bi-arrowed line indicates a vibration amplitude, and each arrowed line having a square base point indicates an amount of shifting of the center of vibration (i.e., a center-shifting amplitude).

When a large quantity of image shake occurs, only the vibration amplitude (indicated by the bi-arrowed lines) is increased. Thus, since the amount of shifting of the center does not change, the behavior of shifting of the average position of the focusing lens 105 (indicated by dotted lines) does not differ, in terms of time, from that taken when no image shake occurs. Under this condition, two AF evaluation values resulting from a larger difference in position of the focusing lens 105 can be obtained.

On the contrary, should the amount of shifting of the center be increased instead, a variation in the average position of the focusing lens 105 becomes large, so that there is an increased probability that the position of the focusing lens 105 may deviate from a range corresponding to the depth of focus. In this case, an unfavorable, unsteady focusing state will occur frequently.

Figure 6:
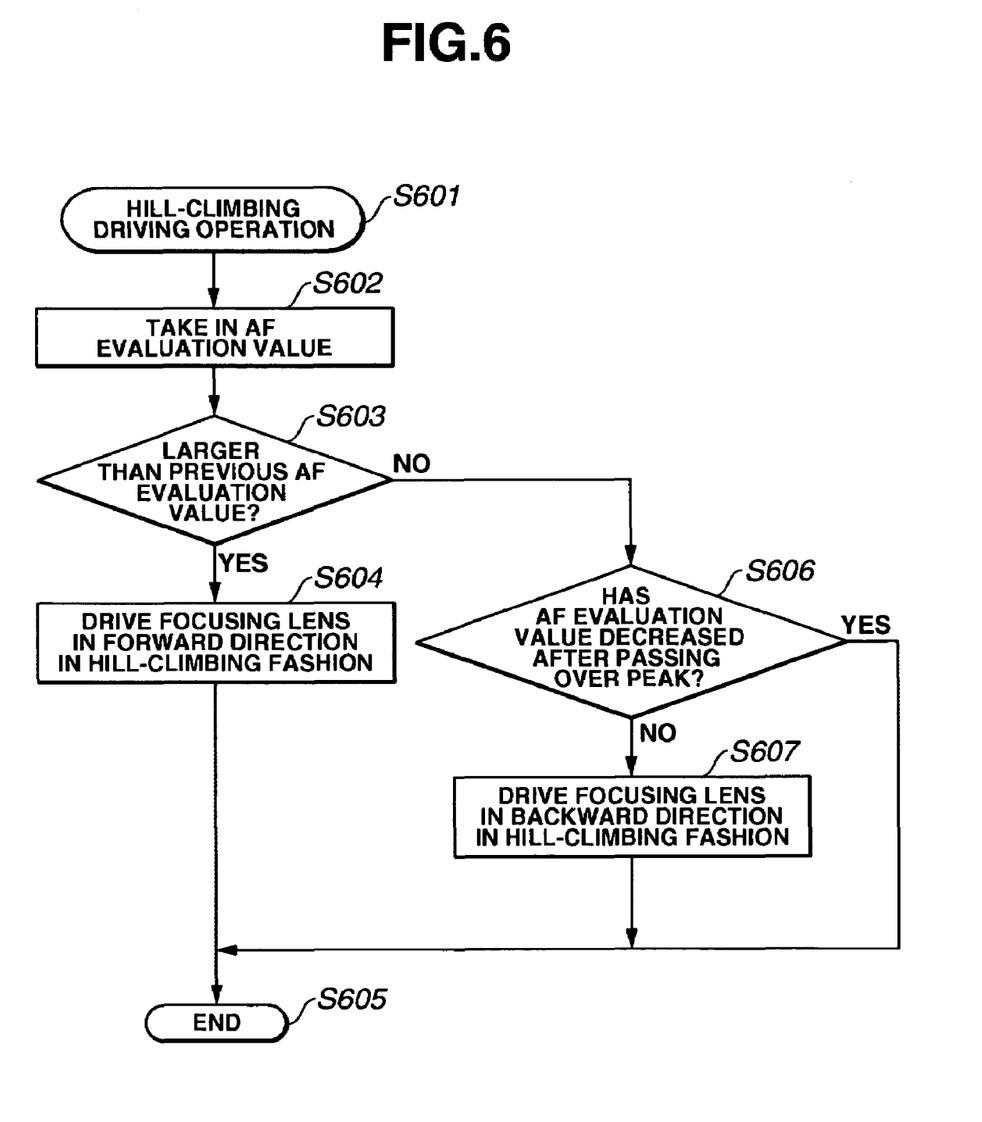
FIG. 6 is a flow chart illustrating a hill-climbing driving operation for moving the focusing lens in such a direction as to increase an AF evaluation value.

The hill-climbing driving operation is described next with reference to FIG. 6.

At step S601, the processing flow for the hill-climbing driving operation begins.

At step S602, an AF evaluation value is taken in from the AF evaluation processing circuit 113.

At step S603, a check is made to see if the AF evaluation value taken in at the step S602 is larger than the previous AF evaluation value. If so, the processing flow proceeds to step S604. If not, the processing flow proceeds to step S606.

At step S604, the focusing lens 105 is driven in the hill-climbing fashion at a predetermined speed in the forward direction (i.e., in the same direction as the previous one). Then, the processing flow proceeds to step S605, where the present process comes to an end.

At step S606, a check is made to see if the AF evaluation value has decreased after passing over a peak. If not, the processing flow proceeds to step S607. If so, the processing flow proceeds to step S605, where the present process comes to an end. In this case, the processing flow proceeds to the minute driving operation.

At step S607, the focusing lens 105 is driven in the hill-climbing fashion at a predetermined speed in the backward direction (i.e., in the direction opposite to the previous one). Then, the processing flow proceeds to step S605, where the present process comes to an end.

Figure 7:
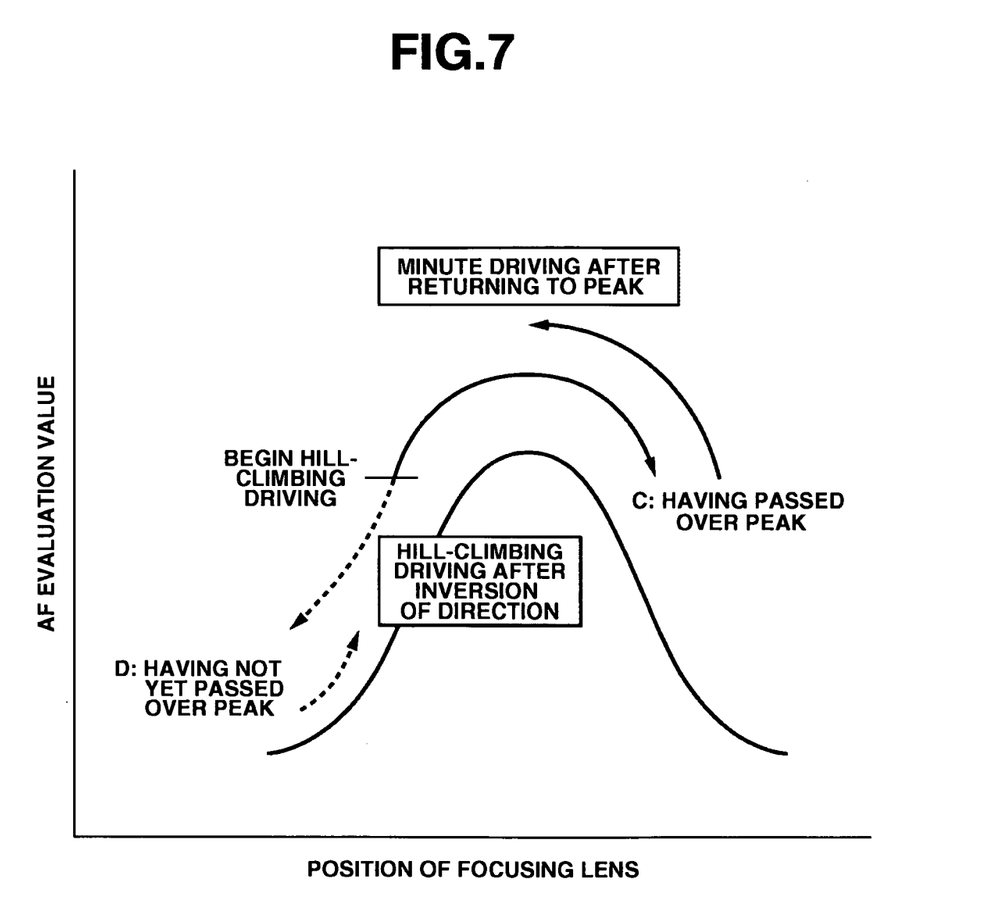
FIG. 7 is a diagram showing the movement of the focusing lens during the hill-climbing driving operation.

FIG. 7 shows the behavior of the focusing lens 105 during the hill-climbing driving operation described above. In FIG. 7, a solid curve C indicates that, since the AF evaluation value decreases after passing over the peak, an in-focus point is considered to be found and, therefore, the processing flow brings the hill-climbing driving operation to an end and proceeds to the minute driving operation. On the other hand, a dotted curve D indicates that, since the AF evaluation value decreases without passing through a peak, the driving direction of the focusing lens 105 is considered to be misjudged and, therefore, the processing flow continues the hill-climbing driving operation after causing the driving direction of the focusing lens 105 to be inverted.

As described above, in order to attain and maintain an in-focus state, the camera AF microcomputer 114 operates to make the AF evaluation value reach a predetermined value, for example, a maximum value, by causing the focusing lens 105 to move while repeating the above-stated processes, i.e., the in-focus/restart determining process—the minute driving operation—the hill-climbing driving operation—the minute driving operation—the in-focus/restart determining process—. . . , in that order.

With the video camera as configured above, in a photographic condition where a large quantity of image shake occurs, an amount of movement of the focusing lens 105 is increased as much as a change of the AF evaluation value increases (i.e., noise increases) owing to image shake. Thus, a change of the AF evaluation value caused by the movement of the focusing lens 105 is increased to heighten an S/N ratio of the AF evaluation value. Therefore, the precision in determining a direction of moving the focusing lens 105 can be improved.

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, and then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, a CD-ROM, a CD-R, a magnetic tape, a non-volatile type memory card, and a ROM, can be used for providing the program codes.

Furthermore, besides the aforesaid functions according to the above embodiments being realized by executing the program codes which are read by a computer, the present invention includes a case where an OS (operating system) or the like running on the computer performs a part of or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part of or entire processes in accordance with the designations of the program codes and realizes functions of the above embodiments.

In a case where the present invention is applied to the aforesaid storage medium, the storage medium stores program codes corresponding to the flowcharts described in the embodiments.

The present invention is not limited to the above embodiments and various changes and modifications can be made within the spirit and scope of the present invention. Therefore, to apprise the public of the scope of the present invention, the following claims are made.

What is claimed is:

1. A focus adjusting system comprising:
    an optical unit movable to adjust a focus of an object image to an image capture unit for imaging an abject to produce a signal representative of the object image; and
    a moving unit that moves the optical unit in the direction where the level of a high-frequency component of the signal captured from the image capture unit becomes higher, wherein the moving unit sets driving amplitude of the optical unit before movement of the optical unit in the direction where the level of high-frequency component of the signal becomes higher, wherein the moving unit increases the range of the driving amplitude when a quantity of image shake of the object image is larger than a predetermined level.

2. An image capture apparatus comprising:

an image capture unit for imaging an object via an optical unit to produce a signal representative of the object image; and a moving unit that moves the optical unit in the direction where the level of a high-frequency component of the signal captured from the image capture unit becomes higher, wherein the moving unit sets a driving amplitude of the optical unit before movement of the optical unit in the direction where the level of high-frequency component becomes higher, wherein the moving unit increases the range of the driving amplitude when a quantity of image shake of the object image is larger than predetermined level.

3. A focus adjusting system according to claim 1, wherein when increasing the range of the driving amplitude, the center position of the driving amplitude is the same when the quantity of image shake is larger than the predetermined level and when the quantity of image shake is less than the predetermined level.

4. A focus adjusting system according to claim 1, wherein when increasing the range of the driving amplitude, the optical units passes the center of the range of driving amplitude faster when the quantity of image shake is larger than the predetermined level, compared to when the quantity of image shake is smaller than the predetermined level.

5. An image capture apparatus according to claim 2, wherein when increasing the range of the driving amplitude, the center position of the driving amplitude is the same when the quantity of image shake is larger than the predetermined level and when the quantity of image shake is less than the predetermined level.

6. An image capture apparatus according to claim 2, when increasing the range of the amplitude, the optical units passes the center of the range of driving amplitude faster when the quantity of image shake is larger than the predetermined level, compared to when the quantity of image shake is smaller than the predetermined level.

* * * * *